United States Patent [19]

Takahashi

[11] Patent Number: 4,895,000
[45] Date of Patent: Jan. 23, 1990

[54] AIR CONDITIONING SYSTEM FOR VEHICLES

[75] Inventor: Tadahiro Takahashi, Konan, Japan

[73] Assignee: Diesel Kiki Co., Ltd., Tokyo, Japan

[21] Appl. No.: 223,273

[22] Filed: Jul. 22, 1988

Related U.S. Application Data

[62] Division of Ser. No. 22,285, Mar. 5, 1987, Pat. No. 4,783,970.

[30] Foreign Application Priority Data

Mar. 12, 1986 [JP] Japan ............................ 61-034637[U]
Mar. 28, 1986 [JP] Japan ............................ 61-045767[U]
Apr. 30, 1986 [JP] Japan ................................ 61-099933

[51] Int. Cl.$^4$ ........................................... F25D 17/06
[52] U.S. Cl. ................................... 62/176.3; 62/176.6; 62/180; 62/228.5; 62/244; 165/30
[58] Field of Search ................. 62/180, 186, 173, 208, 62/209, 176.1, 176.2, 176.3, 176.5, 176.6, 228.1, 228.5, 243, 244, 161, 162, 163, 164, 196.3; 165/42, 43, 41, 30, 35, 36

[56] References Cited

U.S. PATENT DOCUMENTS

| 4,196,338 | 4/1980 | Edel | 340/602 X |
| 4,274,264 | 6/1981 | Andres | 62/213 |
| 4,323,111 | 4/1982 | Iijima | 62/180 X |
| 4,582,124 | 4/1986 | Yoshimi et al. | 62/228.5 |

FOREIGN PATENT DOCUMENTS

| 0124139 | 7/1983 | Japan | 62/176.3 |
| 76410 | 5/1984 | Japan . | |
| 92013 | 6/1984 | Japan . | |
| 150988 | 8/1984 | Japan . | |

Primary Examiner—Harry B. Tanner
Attorney, Agent, or Firm—Frishauf, Holtz, Goodman & Woodward

[57] ABSTRACT

In an air conditioning system for vehicles which includes a compressor of a variable capacity type, a comparison is made between a compressor capacity required for an air conditioning control and a compressor capacity required for a demist control. The compressor capacity is controlled so as to be brought to greater one of the compressor capacities compared with each other. Alternatively, when it is judged that a windowpane is misted, the compressor capacity is increased and, simultaneously, the temperature of air blown into the compartment is raised. Alternatively, the compressor capacity is controlled so as to be increased within a range of a set maximum allowable capacity until the mist on the windowpane is cleared off when it is judged that the mist occurs on the windowpane.

5 Claims, 12 Drawing Sheets

AIR CONDITIONING SYSTEM FOR VEHICLES

This is a division of Ser. No. 022,285, filed 3/5/87, now U.S. Pat. No. 4,783,970.

BACKGROUND OF THE INVENTION

The present invention relates to an air conditioning system for vehicles and, more particularly, to a system for controlling a capacity of a compressor in response to a mist on a vehicle windowpane.

In general, a vehicle has installed therein an air conditioning system by which comfortable, conditioned air is blown into a compartment.

Japanese Provisional Utility Model Publication (Kokai) No. 59-92013 discloses an air conditioning system as shown in FIG. 1. The system comprises a duct 1 having at its upstream end an air intake section 2 and at its downstream end an air blowoff section 3 which communicates with a vehicle compartment. The air intake section 2 is comprised of an indoor-air inlet 2A and an outdoor-air inlet 2B. An indoor-air/outdoor-air selecting damper 2C is provided for selectively opening one of the inlets 2A and 2B. The air blowoff section 3 is comprised of a vent blowoff outlet 3A directed toward the face of an occupant, a defrost blowoff outlet 3B, and a heat blowoff outlet 3C directed toward the feet of the occupant. Mode selecting dampers 3D and 3E are provided for selectively opening and closing the blowoff outlets 3A, 3B and 3C.

A blower 4 variable in amount of blown air is disposed in the upstream end of the duct 1. The blower 4 is adapted to draw air into the duct 1 through the air intake section 2, cause the air to flow through the duct 1 and, subsequently, cause the air to be blown into the compartment through the air blowoff section 3. The blower 4 is driven by drive means 4A.

A refrigerating cycle 5 comprises an evaporator 6 arranged within the duct 1, a condenser 7, and a compressor 8. By the refrigerating cycle 5, the air passing through the duct 1 is cooled.

A heater core 9 is arranged in the duct 1 downstream of the evaporator 6, for heating the air passing through the duct 1.

An air-mix damper 10 located upstream of the heater core 9 is angularly movable about a pivot 10' so that an amount of air passing through the heater core 9 varies depending upon the angular position of the air-mix damper 10. Thus, the temperature of the air flow is determined depending upon the angular position of the air-mix damper 10. The air-mix damper 10 is actuated by actuator means 10A between a full-cool position indicated by the solid line and a full-heat position indicated by the dot-and-dash line.

Various sensors are provided which include an indoor-air temperature sensor 11 for detecting a temperature Tr within the compartment, an outdoor-air temperature sensor 12 for detecting a temperature Ta of the oputdoor air, and an insolation sensor 13 for detecting an amount of insolation Ts. Outputs from the respective sensors 11, 12 and 13 are sent to control means 15 to be described later. A temperature setter 14 provided into which it is possible to input a temperature desired to be set as a temperature within the compartment, i.e., a desired set temperature TD.

The control means 15 includes a synthetic signal arithmetic unit 16 and a control unit 17. Based on the indoor-air temperature TR, the outdoor-air temperature TA, the amount of insolation TS and the set temperature TD, the synthetic signal arithmetic unit 16 determines a synthetic signal T in accordance with the following equation:

$$T = aTr + bTa + cTs - dTD \tag{1}$$

where a, b, c and d are constants.

The control unit 17 comprises blower control means 18 for controlling the blower 4 on the basis of the synthetic signal T, damper control means 19 for controlling the indoor-air/outdoor-air selecting damper 2c on the basis of the synthetic signal T, damper control means 20 for controlling the air-mix damper 10 on the basis of the synthetic signal T, mode control means 21 for controlling the mode selecting dampers 3D and 3E, and compressor control means 22 for controlling the compressor 8 on the basis of the synthetic signal T.

When a dew condensation sensor, not shown, detects a mist on a vehicle windowpane, demist control is carried out. The demist control does mean control in which the indoor-air inlet 2A is opened and the compressor 8 is driven to actuate the refrigerating cycle 5, and the defrost blowoff outlet 3B is opened to blow dried air against the windowpane, to thereby clear off the mist on the windowpane. Such demist control may be carried out by the driver's operation of a demist switch.

The assignee of the present application has disclosed a so-called variable capacity type compressor as such compressor 8, in Japanese Provisional Utility Model Publications (Kokai) Nos. 59-92013 and 59-76410, both assigned to the assignee of the present applications. The compressor has a capacity varying mechanism which is controlled by a capacity setter.

When such a condition is satisfied that a mist occurs on an inner surface of a windowpane, if the compressor has already been turned on and been run, the capacity of the compressor is increased by a predetermined amount to increase the dehumidification performance of the compressor, making it possible to quickly clear off the mist.

However, the air conditioning system constructed as described above has various problems which will be discussed below.

When a mist on the windowpane is detected, the capacity of the compressor is increased step by step. Therefore, it takes considerably long time to remove the mist. In addition, there may be a case where the capacity of the compressor required for the air conditioning control increases with an increase in the outdoor-air temperature. Under such circumstance, there may be a case where the compressor capacity required for the air conditioning control becomes greater than the compressor capacity required for the demist control. In such case, however, even if the compressor capacity required for the air conditioning control is greater than that required for the demist control, the compressor capacity is brought to the capacity required for the demist control. This is not preferable for the air conditioning control.

Moreover, so long as the mist on the windowpane is not cleared off, the compressor capacity continues to increase. Accordingly, even if the vehicle compartment is very low in temperature, the compressor would be run under the maximum capacity. This would result in remarkable sacrifice of the temperature control within the compartment.

OBJECTS AND SUMMARY OF THE INVENTION

It is an object of the invention to provide an air conditioning system for vehicles, which is capable of determining the capacity of the compressor so as to satisfy both requirements for air conditioning control and requirements for demist control.

It is another object of the invention to provide an air conditioning system for vehicles, which can clear off a mist on a windowpane while preventing the vehicle compartment from being excessively cooled.

According to the invention, there is provided an air conditioning system for a vehicle, the vehicle having a compartment, and a windowpane, comprising:
- duct means having at an upstream end thereof an air intake section and at a downstream end an air blowoff section in communication with the compartment of the vehicle;
- a refrigerating cycle including a compressor of a variable capacity type, for dehumidifying air flowing through the duct means;
- synthetic signal arithmetic means for computing a synthetic signal based on at least an indoor-air temperature and an outdoor-air temperature;
- detecting means for detecting a mist on the windowpane of the vehicle;
- capacity arithmetic means connected to the synthetic signal arithmetic means for computing a capacity of the compressor required for air conditioning control, based on the synthetic signal;
- auxiliary capacity arithmetic means connected to the detecting means for computing a capacity of the compressor required for demist control for removing the mist, based on an output from the detecting means;
- comparator means connected to the capacity arithmetic means and the auxiliary capacity arithmetic means for comparing the capacity required for the air conditioning control and the capacity required for the demist control with each other; and
- control means connected to the comparator means for controlling the capacity of the compressor so as to be brought to greater one of the capacities compared by the comparator means.

According to the invention, there is further provided an air conditioning system for a vehicle, the vehicle having a compartment, and a windowpane, comprising:
- cooling means for cooling air, the cooling means including a compressor of a variable capacity type;
- heating means for heating air having passed through the cooling means;
- damper means for controlling an amount of air flowing from the cooling means toward the heating means and an amount of air flowing from the cooling means and bypassing the heating means;
- temperature detecting means for detecting a temperature of air within the compartment of the vehicle;
- means for setting a desired temperature within the compartment of the vehicle;
- first control means for controlling the capacity of the compressor in relation to a deviation between the detected temperature and the set temperature;
- second control means for controlling an opening degree of the damper means in relation to the deviation;
- mist detecting means for detecting a mist on the windowpane of the vehicle;
- judging means receiving an output from the mist detecting means, for judging whether or not the windowpane is misted:
- first correction means for increasing the capacity of the compressor by a predetermined amount when it is judged by the judging means that the windowpane is misted; and
- second correction means for correcting the opening degree of the damper means to a position where the amount of air flowing toward the heating means is increased by a predetermined amount.

According to the invention, there is further provided an air conditioning system for a vehicle, the vehicle having a compartment, and a windowpane, comprising:
- duct means having one end thereof in communication with the compartment of the vehicle;
- a refrigerating cycle including an evaporator arranged within the duct means, and a compressor of a variable capacity type;
- mist judging means for judging whether or not a mist occurs on the windowpane of the vehicle;
- temperature data generating means for generating data relating to a temperature within the compartment;
- maximum capacity setting means for setting maximum allowable capacity of the compressor, based on an output from the temperature data generating means; and
- compressor control means for controlling the capacity of the compressor so as to be increased within a range of the maximum allowable capacity set by the maximum capacity setting means until the mist on the windowpane is cleared off when it is judged by the mist judging means that the mist occurs on the windowpane.

The above and other objects, features and advantages of the invention will be more apparent from the ensuing detailed description taken in conjunction with the accompanying drawings.

BRIEF DESCRIPTION OF THE DRAWINGS

FIG. 7a is a graphical representation of the relationship between an amount of blown air and a synthetic signal, the control of the amount of blown air shown in FIG. 6 being based on the characteristic of FIG. 7a;

DETAILED DESCRIPTION

Various embodiments of an air conditioning system for vehicles according to the invention will be described in detail with reference to the drawings.

Figure 1:
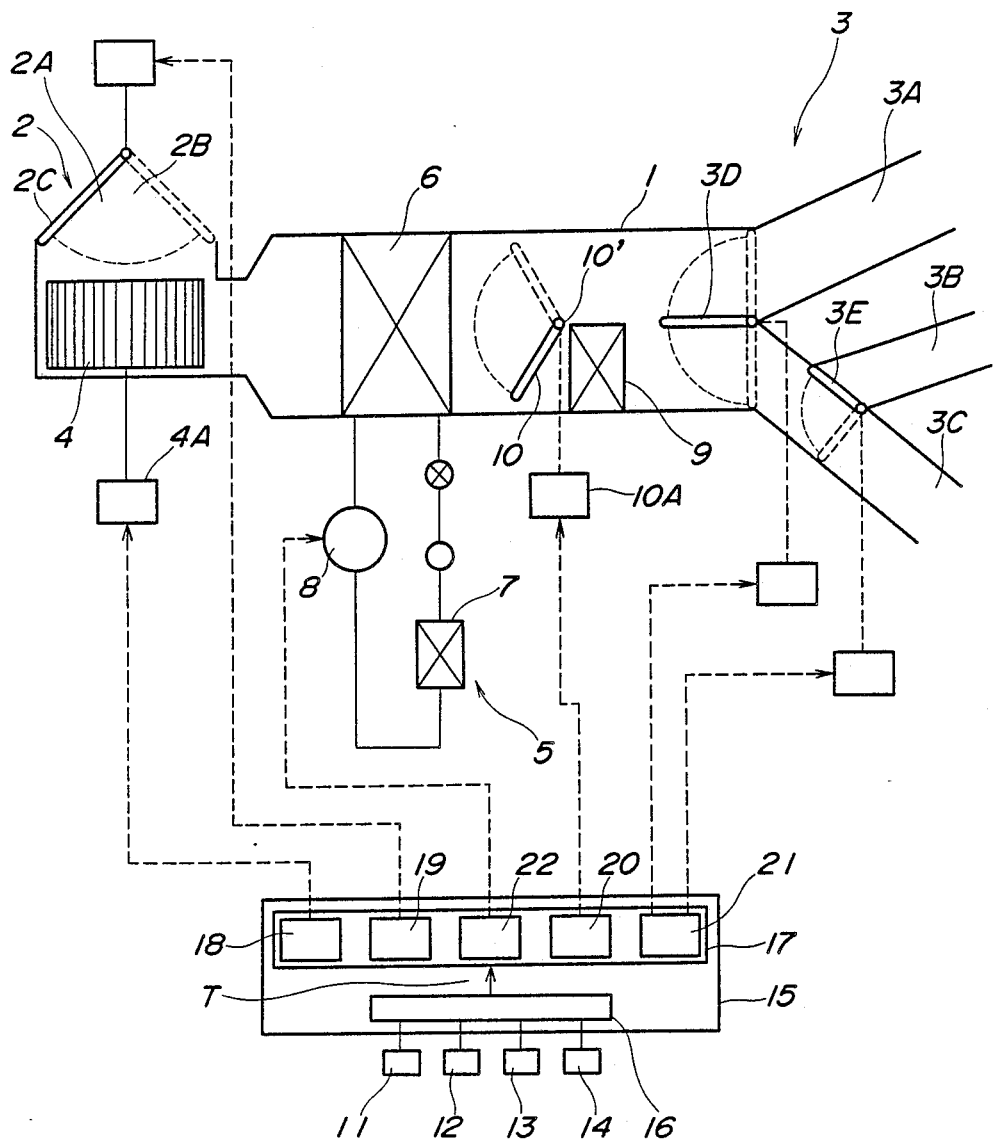
FIG. 1 is a diagrammatic view showing an air conditioning system of the prior art.
Figure 2:
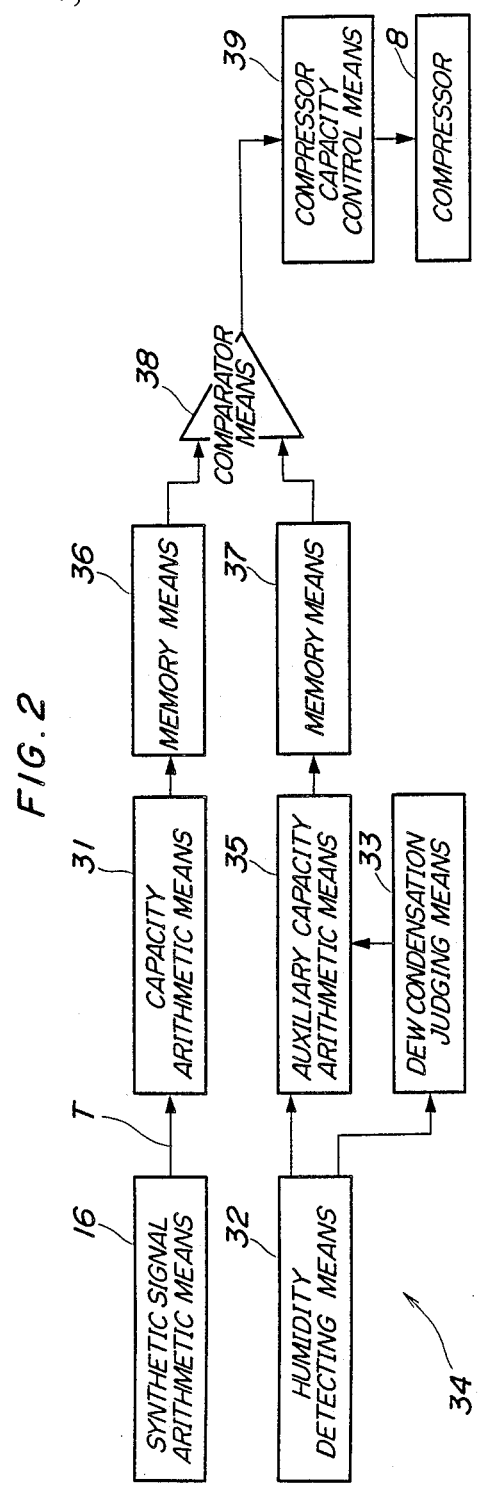
FIG. 2 is a block diagram of a control system incorporated in an air conditioning system according to a first embodiment of the invention.
Figure 3:
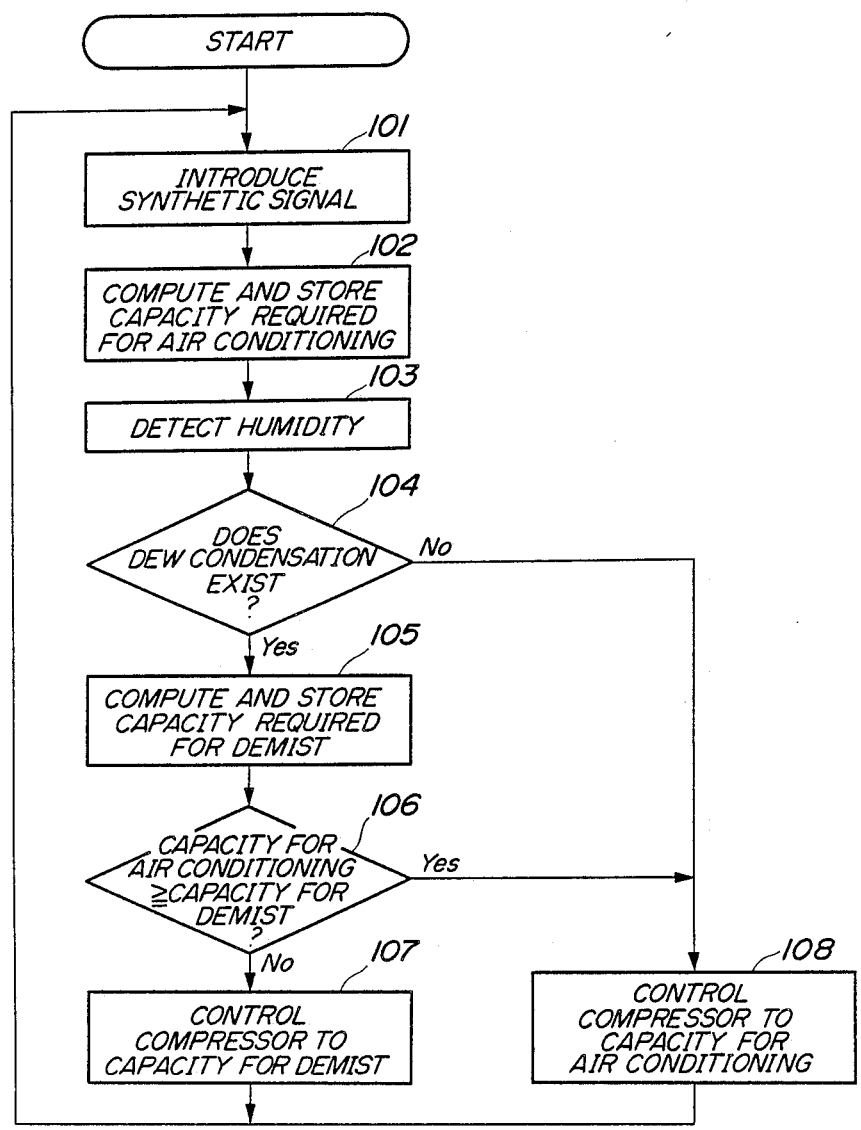
FIG. 3 is a flow chart showing the operation of the control system of FIG. 2.

A first embodiment of the invention is shown in FIGS. 2 and 3 in which the same reference numerals are used to designate parts and components corresponding to those shown in FIG. 1, and the description of such corresponding parts and components will be omitted.

A compressor 8 used in the first embodiment is of a variable capacity type having a capacity varying mechanism. Such capacity varying mechanism is disclosed in, for example, Japanese Provisional Patent Publication (Kokai) No. 59-150988 assigned to the same assignee. The first embodiment comprises a capacity arithmetic means 31 for computing the capacity of the compressor 8 required for ordinary air conditioning control. The capacity arithmetic means 31 computes the capacity of the compressor 8, based on a synthetic signal T outputted by synthetic signal arithmetic means 16.

The first embodiment further comprises humidity detecting means 32 for detecting humidity in the vicinity of an inner surface of a windowpane, and dew condensation judging means 33 for judging a dew condensation on the inner surface of the windowpane, based on an output from the humidity detecting means 32.

The judging means 33 compares the humidity value detected by the detecting means 32 with a predetermined value, and judges that a dew condensation occurs, when the humidity value is higher than the predetermined value. The detecting means 32 and the judging means 33 constitute mist detecting means 34.

Auxiliary capacity arithmetic means 35 is provided for computing a capacity of the compressor 8 required for the demist control. The arithmetic means 35 computes the capacity of the compressor 8 required for the demist control, based on the output from the humidity detecting means 32 and the output from the dew condensation judging means 33.

The auxiliary capacity arithmetic means 35 is so arranged as to increase the capacity of the compressor as the humidity detected by the detecting means 32 is higher, and to lower the capacity as the humidity is lower.

A pair of memory means 36 and 37 are provided. One of the memory means 36 stores therein the output from the capacity arithmetic means 31, i.e., the capacity of the compressor 8 required for the air conditioning control. The other memory means 37 stores therein the output from the auxiliary capacity arithmetic means 35, i.e., the capacity value of the compressor 8 required for the demist control.

The outputs from the respective memory means 36 and 37 are inputted into comparator means 38. The comparator means 38 outputs higher one of the capacity values outputted from the respective memory means 36 and 37, to a subsequent, compressor capacity control means 39. The capacity control means 39 controls the capacity of the compressor 8 so as to be brought to the capacity value outputted from the comparator means 38.

If the compressor 8 is of a swash plate type, the capacity control means 39 controls the capacity varying mechanism of the compressor 8 to vary the inclination of the swash plate to thereby alter the capacity of the compressor 8.

The operation of the first embodiment shown in FIG. 2 will next be described with reference to FIG. 3.

First, the synthetic signal T is introduced into the capacity arithmetic means 31 in a step 101. In a step 102, the capacity of the compressor 8 is computed on the basis of the synthetic signal T and, subsequently, the capacity value is stored in the memory means 36.

Subsequently, in a step 103, the humidity detecting means 32 detects the humidity in the vicinity of the inner surface of the windowpane. In a step 104, based on the detected humidity, the judging means 33 judges whether or not a dew condensation occurs on the inner surface of the windowpane. If the judgment indicates the occurrence of dew condensation, the auxiliary capacity arithmetic means 35 computes, in a step 105, the capacity of the compressor 8 required for the demist control, and the capacity value is stored in the memory means 37.

Subsequently, in a step 106, the comparator means 38 compares the capacity values stored in the respective memory means 36 and 37 with each other. If the comparison indicates that the capacity value stored in the memory means 36 is greater than that stored in the memory means 37, the compressor capacity control means 39 controls, in a step 107, the capacity of the compressor 8 so as to be brought to the capacity value required for the air conditioning control.

On the other hand, if the above comparison in the step 106 indicates that the capacity value stored in the memory means 37 is greater than that stored in the memory means 36, the control means 39 controls, in a step 108, the capacity of the compressor 8 so as to be brought to the capacity value required for the demist control.

In this manner, according to the first embodiment of the invention it is possible to satisfy the requirements for the ordinary air conditioning control, even during execution of the demist control.

As described above, in the first embodiment of the invention, the compressor capacity value required for the air conditioning control and the compressor capacity value required for the demist control are compared with each other, and the compressor capacity is controlled so as to be brought to higher one of the above capacity values. Consequently, even during execution of the demist control, the compressor capacity is prevented from becoming insufficient for the air conditioning control. Thus, the air conditioning is carried out in a comfortable manner.

Figure 4:
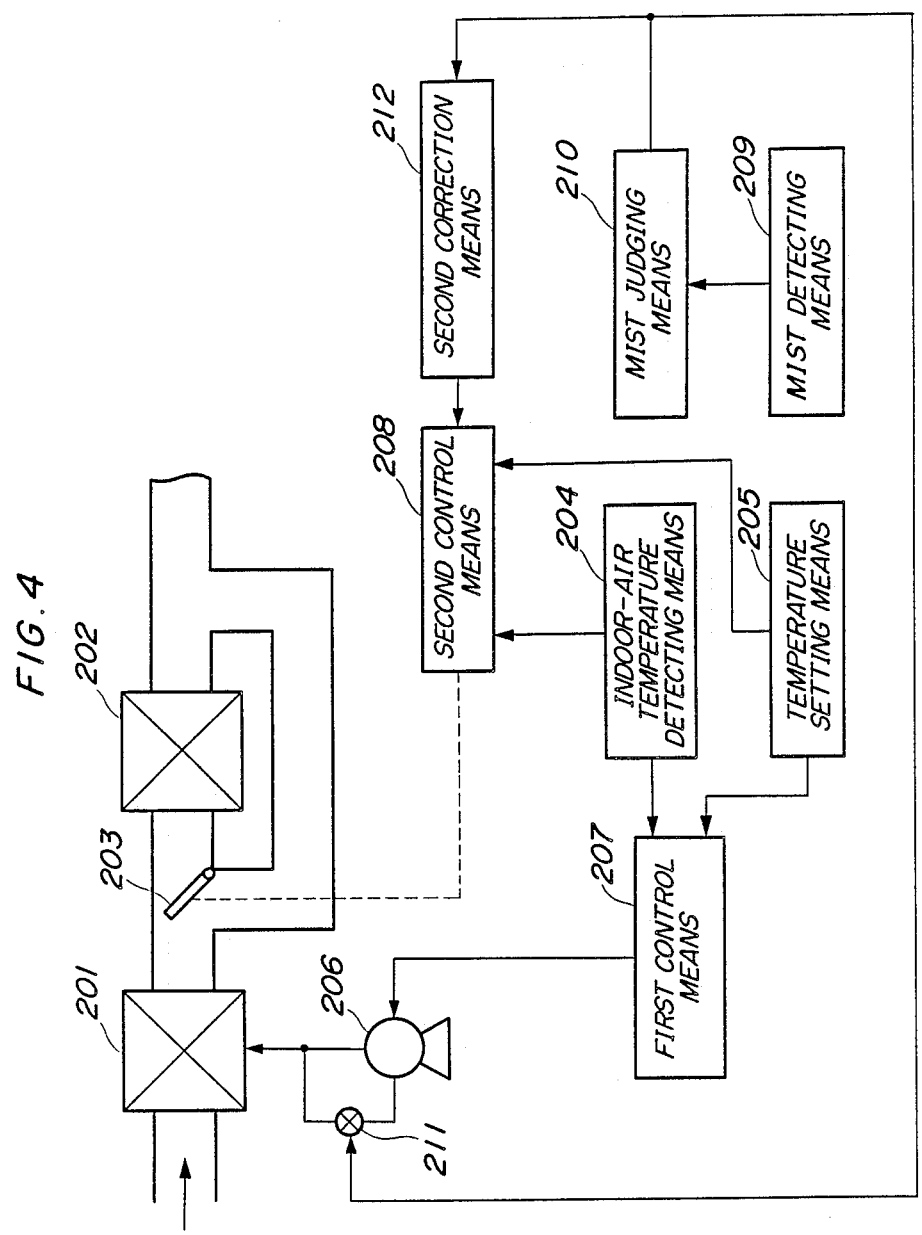
FIG. 4 is a block diagram illustrating the concept of a second embodiment of the invention.

FIG. 4 shows the concept of a second embodiment of the invention. In the second embodiment, cooling means 201 including a compressor 206 and an evaporator, not shown, is provided for cooling air, and heating means 202 is provided for heating the air having passed through the cooling means 201. Damper means 203 is adapted to control the amount of air flowing from the cooling means 201 toward the heating means 202. First control means 207 controls the capacity of the compressor 206 in relation to a deviation between an actual value of indoor-air temperature detected by indoor-air temperature detecting means 204 and a desired temperature value set by temperature setting means 205. Second control means 208 controls the opening degree or angular position of the damper means 203 in relation to the deviation. Mist detecting means 209 detects a mist on a windowpane of the vehicle. Mist judging means 210 judges whether or not the windowpane is misted, based on an output from the mist detecting means 209. First correction means 211 is provided for increasing the capacity of the compressor 206 by a predetermined amount, when it is judged by the mist judging means 210 that the windowpane is misted. Second correction means 212 is provided for correcting the opening degree of the damper means 203 so as to increase the amount of air flowing to the heating means 202 by a predetermined amount, when is is judged that the windowpane is misted.

With the first embodiment arranged as described above, the drawn air flows through the cooling means 201, the damper means 203 and the heating means 202. After the drawn air has passed through the cooling means 201, part of the air is directed toward the healing means 202, the amount of which is controlled depending upon the opening degree of the damper means 203. The air flow having passed through the heating means 202 and the air flow having bypassed the same are joined to each other and, subsequently, are blown into a vehicle compartment.

On the other hand, the capacity of the compressor 206 is controlled by the first control means 207 in relation to the deviation between the actual indoor-air temperature value detected by the indoor-air temperature detecting means 204 and the desired temperature value set by the temperature setter 205. In addition, the opening degree of the damper means 203 is also controlled by the second control means 208. Thus, the temperature within the compartment is controlled so as to be brought to the set temperature value.

The mist on the windowpane is detected by the mist detecting means 209, and the mist judging means 210 connected to the mist detecting means 209 judges whether or not the windowpane is misted.

When the mist judging means 210 judges that the windowpane is misted, the compressor 206 has its capacity increased by the predetermined amount by the first correction means 211. As a result, the humidity of the air blown into the compartment is reduced so that the mist is removed and the windowpane is cleared off. Simultaneously, the second control means 208 receives the output from the second correction means 212 to increase the opening degree of the damper 203 to such a value that the amount of air directed toward the heating means 202 is increased by the predetermined amount. Consequently, the temperature of the air blown into the compartment is raised. Thus, cold feeling is not given to the occupant, regardless of the increase in the capacity of the compressor.

Figure 5:
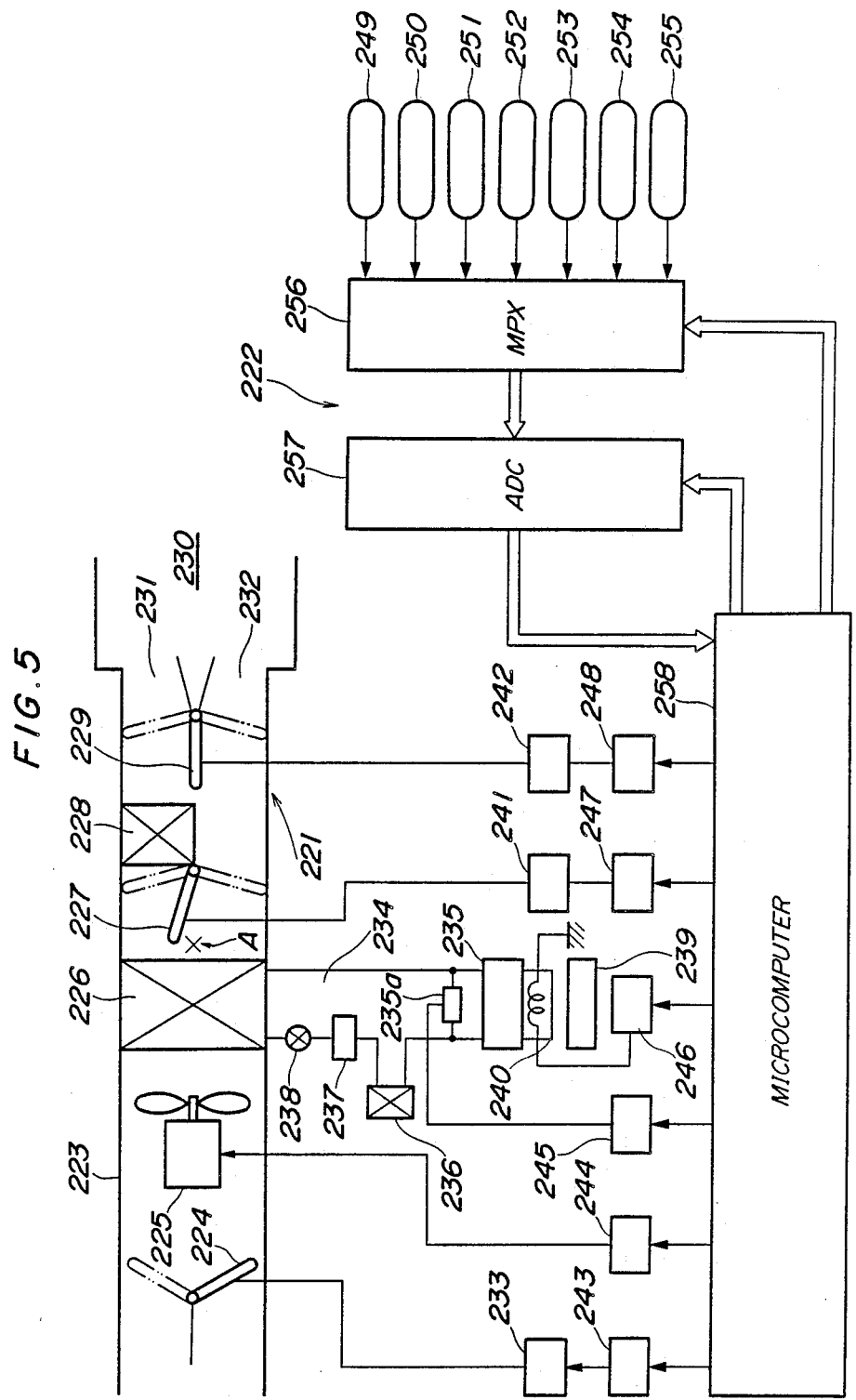
FIG. 5 is a diagrammatic view showing a specific arrangement of the second embodiment illustrated in FIG. 4.

A specific arrangement of the second embodiment shown in FIG. 4 will be described with reference to FIG. 5. As shown in FIG. 5, the air conditioning system comprises an air conditioner body 221, and a control system 222 for controlling the air conditioner body 221.

The air conditioner body 221 includes an indoor-air/outdoor-air selecting damper 224 for allowing selected one of indoor air and outdoor air to be drawn into the air conditioner body 221. A blower 225 is located downstream of the selecting damper 224, for delivering air drawn through the selecting damper 224, toward a vehicle compartment 230. An evaporator 226 is located downstream of the blower 225, for cooling the air during operation of a refrigerating cycle 234 to be described later. An air-mix damper 227 is located downstream of the evaporator 226, for controlling the amount of air flowing from the evaporator 226 toward a heater core 228. Cooling water from an internal combustion engine, not shown, installed on the vehicle is recirculated through the heater core 228 so that the water serves as a heating medium for heating the air passing through the heater core 228. A mode selecting damper 229 is located downstream of the heater core 228, for selecting air blowoff outlets to the compartment 230.

The above-noted refrigerating cycle 234 is comprised of a compressor 235, a condenser 236, a receiver tank 237, and an expansion valve 238, in addition to the evaporator 226. A bypass on-off valve 235a is associated with the compressor 235, for causing a portion of discharged refrigerant to be bypassed to a suction side of the compressor 235, so that the opening and closing of the bypass on-off valve 235a enable the cooling degree of the refrigerating cycle 234 to be switched to a low value or, a high value. The internal combustion engine installed on the vehicle has an output shaft connected to a pulley 239 so that rotation of the output shaft is transmitted to the pulley 239. Rotation of the pulley 239 is, in turn, transmitted to the compressor 235 through an electromagnetic clutch 240, so that the compressor 235 can be driven.

The air blowoff outlets to the compartment 230 includes a vent blowoff outlet 231 directed toward the face of an occupant, and a heat blowoff outlet 232 directed toward the feet of the occupant. One or both of the outlets 231 and 232 is or are selected by the mode selecting damper 229.

The indoor-air/outdoor-air selecting damper 224, the air-mix damper 227, and the mode selecting damper 229 are actuated by motor actuators 233, 241, and 242, respectively. The motor actuator 233, the blower 225, the bypass on-off valve 235a, and the motor actuator 241 are driven by drive circuits 243 to 248, respectively.

Various sensors are provided which include a humidity sensor 249 for detecting humidity in the vicinity of the windowpane, an indoor-air temperature sensor 250 for detecting the temperature within the compartment 230, an insolation amount sensor 251 for detecting the amount of insolation, an evaporator outlet air temperature sensor 252 for detecting the temperature air at the outlet of the evaporator 226, i.e., a temperature at a location A, and an outdoor-air temperature sensor 253 for detecting the temperature of outdoor air. A setter 254 is for setting a temperature value within the compartment 230. A potentiometer 255 is also provided for detecting the opening degree of the air-mix damper 227. Outputs from the respective sensors, an output from the setter 254 and an output from the potentiometer 255 are supplied to an A/D converter (hereinafter referred to as ("ADC") 257 through a multiplexer (MPX) 256, and are converted into digital data b4 the ADC 257. The digital data obtained by the ADC 257 are supplied to a microcomputer 258.

The microcomputer 258 is mainly comprised of a CPU, a read-only memory (ROM) having a program stored therein, a random access memory(RAM) for storing data, an input port, and an output port. The digital data outputted from the ADC 257 are read out in accordance with the program stored in the ROM, and are processed and computed bV the CPU. The processed and computed data are outputted to the drive circuits 243 to 248 through the output port to control the amount of air delivered by the blower 225, working or operating time and duration of the compressor 235 regulated through the electromagnetic clutch 240, the cooling degree of the refrigerating cycle 234 regulated through the bypass on-off valve 235a, and the opening degree of the air-mix damper 227, so that the temperature within the compartment 230 is controlled so as to be brought to the temperature value set by the setter 254.

Figure 6:
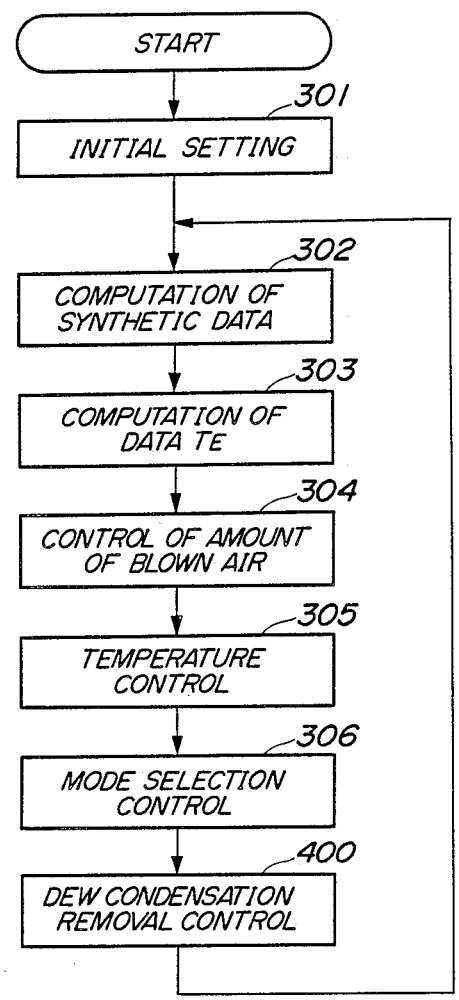
FIG. 6 is a flow chart showing the operation of the arrangement illustrated in FIG. 5.

The operation of the above-described second embodiment in accordance with the program stored in the ROM will be described, based on the flow chart shown in FIG. 6.

As the program is started, the microcomputer 258 is initialized in such a manner that the RAM is cleared, and the bypass on-off valve 235a is controlled to its open position (step 301). Then, the outputs from the respective sensors 249 to 253, the output from the setter 254 and the output from the potentiometer 255, which have been converted into the digital data, are read out through the input port. These outputs are once stored in predetermined areas of the RAM, and a synthetic control value T is computed in accordance with the following equation (2) and is stored (step 302):

$$T = T_R + K_1 T_E + K_2 T_A - K_3 T_S - K_4 T_D + K_5 \quad (2)$$

where $T_R$ is indoor air temperature;

$T_E$ is air temperature at the outlet of the evaporator 226;

$T_A$ is outdoor air temperature;

$T_S$ is amount of insolation;

$T_D$ is temperature set by the setter 254; and $K_1$ to $K_5$ are constants.

In this way, the synthetic control value T is determined as a function of a value of the deviation between the set temperature $T_D$ within the compartment and the detected indoor-air temperature $T_R$, which is corrected by the air temperature $T_E$ at the outlet of the evaporator 226, the outdoor-air temperature $T_A$ and the amount of insolation $T_S$. Thus, the synthetic control value T can be said to be a value in relation to a thermal load on the air conditioning system, according to which the microcomputer 258 controls the temperature within the compartment to the set temperature value.

Subsequent to the step 302, data $T_F$ are computed in accordance with the following equation (3) and are stored (step 303):

$$T_F = T_E + K_6 \theta + \beta \quad (3)$$

where $\theta$ represents opening degree of the air-mix damper 227; and $K_6$ and 62 are constants.

The opening degree $\theta$ of the air-mix damper 227 is set to 100% (Full Heating) when all the air having passed through the evaporator 226 is caused to pass through the heater core 228. Thus, it will be seen that the data $T_F$ correspond to the temperature of the air blown into the compartment 230.

Figure 7A:
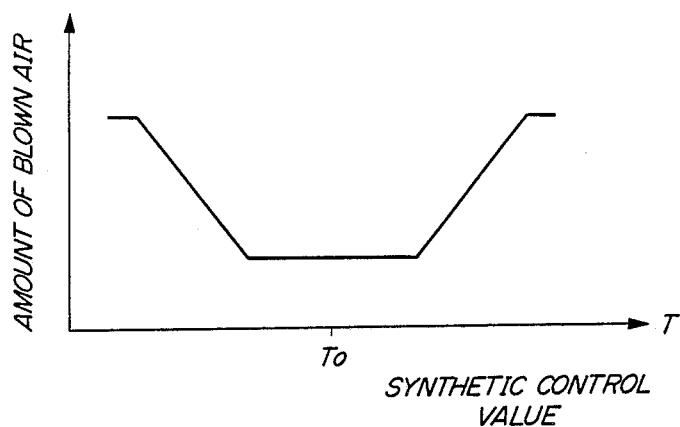
Figure 7B:
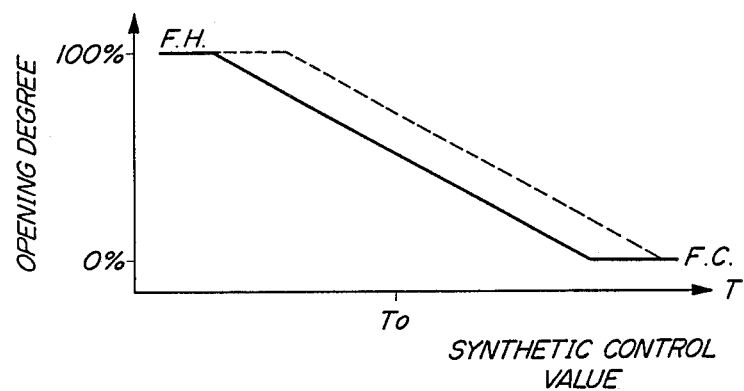
FIG. 7b is a graphical representation of the relationship between opening degree of an air-mix damper and the synthetic signal, the temperature control shown in FIG. 6 being based on the characteristic of FIG. 7b.

Subsequent to the step 303, the amount of air delivered by the blower 225 is controlled in accordance with a pattern shown in FIG. 7a (step 304). Then, the opening degree of the air-mix damper 227 is controlled in accordance with a pattern indicated by the solid line in FIG. 7b, and a set temperature at or above which the compressor 235 is to be actuated controlled in accordance with a pattern shown in FIG. 7c (step 304). The temperature control is effected in such a manner that the supply of electric power to the magnetic clutch 240 is controlled so as to drive the compressor 235 when the air temperature $T_E$ at the outlet of the evaporator 226 is equal to or higher than values of the pattern shown in FIG. 7c. By this temperature control, the indoor-air temperature within the compartment 230 is controlled to the set temperature value.

Subsequent to the step 304, mode selection control is effected based on the data $T_F$ to select the vent blowoff outlet 231 and/or the heat blowoff outlet 232 (step 306). Then, dew condensation removal control is effected (step 400). Subsequent to the step 400, the step 302 is again carried out. Incidentally, the indoor-air/outdoor-air selecting damper 224 is controlled to an outdoor-air introducing position or to an indoor-air introducing position in accordance with an output from a manually operated switch, not shown, which is supplied to the microcomputer 258. Therefore, the operation of the damper 224 is omitted from the flow chart of FIG. 6.

Figure 8:
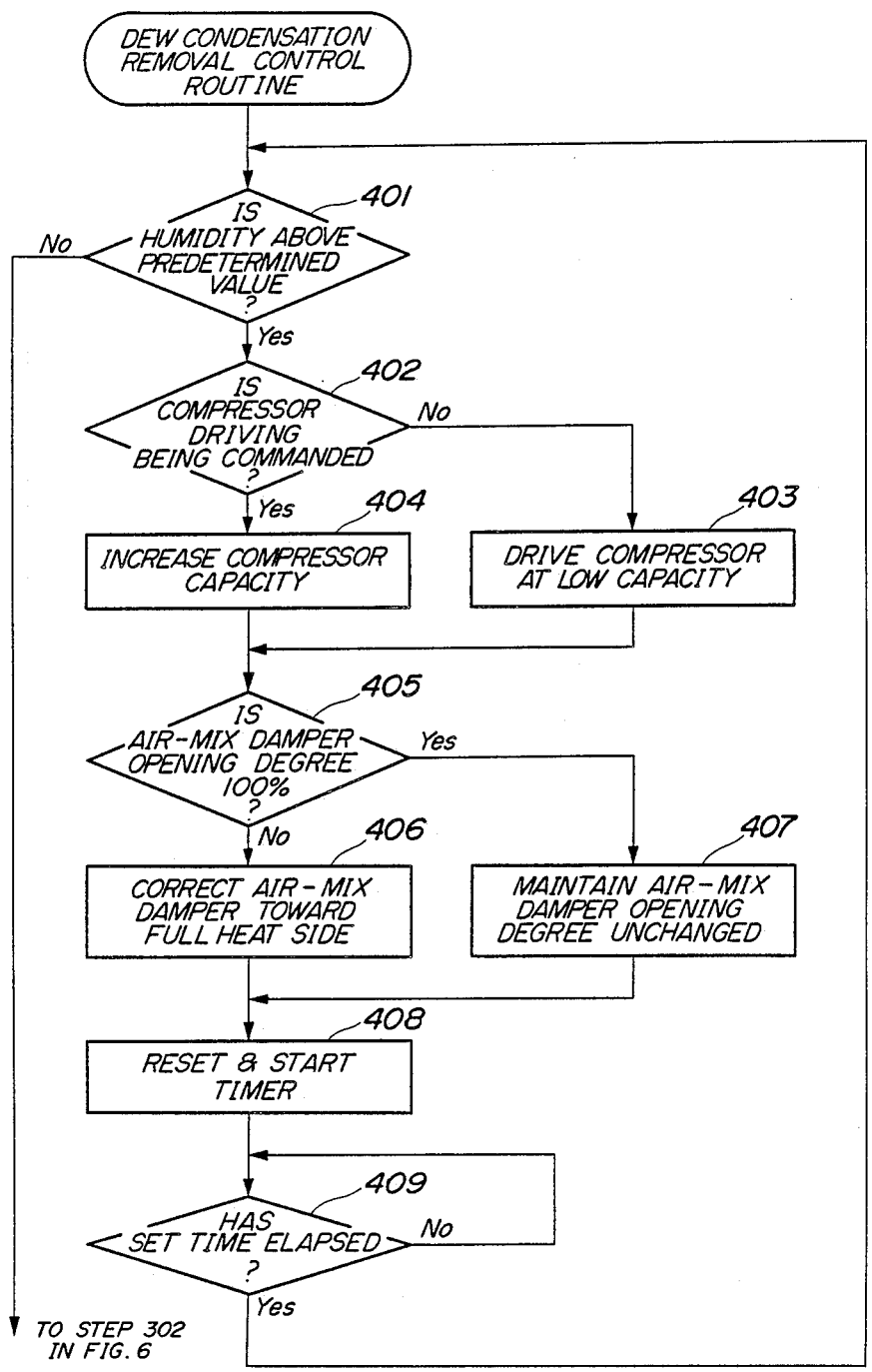
FIG. 8 is a flow chart of dew condensation removal control shown in FIG. 6.

The step 400 is carried out in a manner as shown in FIG. 8. It is judged whether or not the humidity detected by the humidity sensor 249 is equal to or higher than a predetermined value, for example, 85% RH (step 401). When the judgment indicates that the humidity is lower than 85% RH, it is judged that the windowpane is not misted, and step 302 is carried out subsequent to the step 401.

Figure 7C:
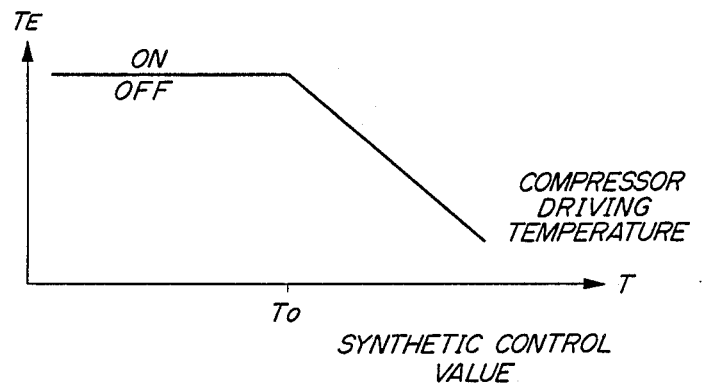
FIG. 7c is a graphical representation of the relationship between air temperature at an outlet of an evporator and the synthetic signal, the temperature control shown in FIG. 6 being based on the characteristic of FIG. 7c.

In the step 401, when the judgment indicates that the humidity is equal to or higher than 85% RH, it is judged that the windowpane is misted. Then, subsequent to the step 401, it is judged whether or not a driving command is supplied to the compressor 235 (step 402). In the step 402, when it is judged that the driving command is not supplied to the compressor 235, this means that the compressor 235 is held in operative by means of a manual switch and that the magnetic clutch 240 is in its disengaged position when the driving temperature $T_E$ is above the pattern values as shown in FIG. 7c. In such case, the compressor 235 is driven, with the bypass on-off valve 235a being in its open position step 403). In a step 404, the compressor 235 is driven, although then it is not required for the temperature control to drive the compressor. In this case, the capacity of the compressor 235 assumes a small value (capacity during normal air conditioning), because the bypass on-off valve 235a is opened.

When the driving command is supplied to the compressor 235 in the step 402, the bypass on-off valve 235a is moved to its closed position, subsequent to the step 402, so that the capacity of the compressor 235 is corrected to an increased value (step 404). Accordingly, the cooling rate of the refrigerating cycle 234 is increased.

Thus, when it is judged in the step 401 that the windowpane is misted, the air within the compartment 230 is substantially cooled regardless of the condition of the temperature control in the steps 403 and 404, so that the mist on the windowpane is cleared off.

Subsequent to the steps 403 and 404, it is judged in a step 405 whether or not the opening degree θ of the air-mix damper 227 is 100%, that is, in the full heat position (F.H) where all the air having passed through the evaporator 226 is allowed to flow to the heater core 228. When it is judged in the step 405 that the opening degree of the air-mix damper 227 is not 100%, the opening degree of the air-mix damper 227 is corrected toward the full heat side as indicated by the broken line in FIG. 7b (step 406). When it is judged in the step 405 that the opening degree of the air-mix damper 227 is 100, the opening degree is maintained unchanged (step 407). The amount of opening degree correction toward the full heat side in the step 405 is set to such a value as to compensate for an increase in the cooling degree of the indoor air within the compartment 230 due to the increase in the capacity of the compressor to thereby avoid a sudden change in temperature within the compartment 230. In this way, the humidity of the indoor air can be reduced to clear off the mist on the windowpane, without making the occupant feel cold.

After executive of the steps 406 and 407, a timer is reset and is simultaneously started (step 408) to start clocking or count a set time. When it is judged that the set time elapses (step 409), the step 401 is again carried out.

In this way, the steps 401 to 409 are repeatedly carried out until the mist on the windowpane is cleared off. When it is judged in the step 401 that the mist has been cleared off, the program is again returned to the main routine of the step 302.

As described above, according to the second embodiment of the invention, when it is judged that the windowpane is misted, the capacity of the compressor is increased to reduce the humidity of the air blown into the compartment, to thereby clear off the mist on the windowpane. At the same time, the amount of air directed toward the heater is increased and, therefore, the temperature of the air blown into the compartment is raised. Accordingly, the cold due to the increase in the compressor capacity is cancelled by the increase in the air temperature. Thus, it is possible to clear off the mist on the windowpane without giving uncomfortableness to the occupant.

Figure 9:
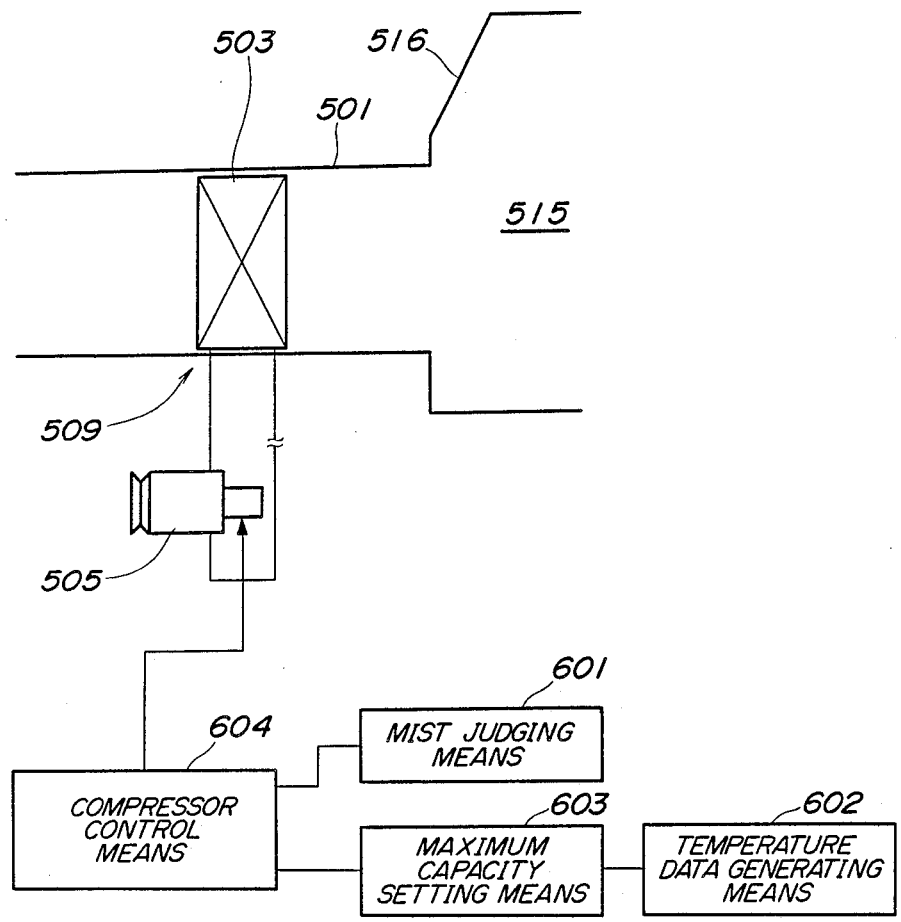
FIG. 9 is a block diagram showing the concept of a third embodiment of the invention.

FIG. 9 shows the concept of a third embodiment of the invention, which comprises a duct 501 having one end thereof in communication with a vehicle compartment 515. A refrigerating cycle 509 includes an evaporator 503 arranged within the duct 501, and a compressor 505 of a variable capacity type for compressing refrigerant evaporated at the evaporator 503. Mist judging means 601 is provided for judging whether or not a mist occurs on a windowpane 516 defining the compartment 515, and temperature data generating means 602 is also provided for generating data regarding the temperature within the compartment 515. Maximum capacity setting means 603 is provided for setting the maximum allowable capacity of the compressor 505 in accordance with an output from the temperature data generating means 602. Compressor control means 604 controls the capacity of the compressor 505 so as to increase the capacity within a range set by the maximum capacity setting means 603 until the mist on the windowpane 516 is cleared off when it is judged by the mist judging means that the mist occurs on the windowpane 516.

The third embodiment arranged as above is identical with the conventional air conditioning system described previously in that when it is judged by the mist judging means 601 that the windowpane 516 is misted, the capacity of the compressor 505 is controlled by the compressor control means 604 so as to increase. However, according to the third embodiment of the invention, the maximum capacity of the compressor is set by the setting means 603 on the basis of the output from the temperature data generating means 602, and the capacity of the compressor 505 is controlled so as not to exceed the set value. This makes it possible to prevent the capacity of the compressor from becoming excessive, so that the temperature control within the compartment can be prevented from being remarkably sacrificed.

Figure 10:
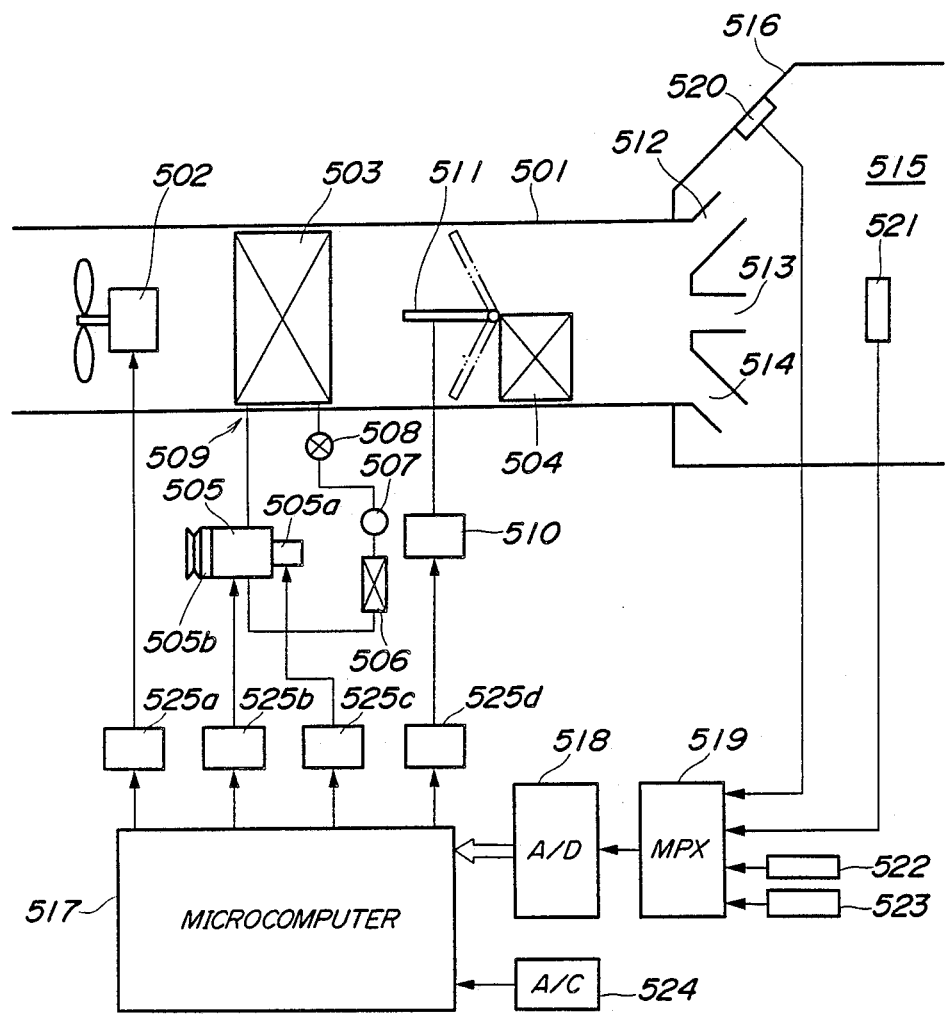
FIG. 10 is a diagrammatic view showing a specific arrangement of the third embodiment illustrated in FIG. 9.

A specific arrangement of the third embodiment shown in FIG. 9 will be described with reference to FIGS. 10 through 12. Referring to FIG. 10, the air conditioning system according to the third embodiment comprises the duct 501 having one end thereof opening into the compartment 515. A blower 502, the evaporator 503 and a heater core 504 are arranged within the duct 501 in the mentioned order with reference to the direction in which air flow passes through the duct 501. The blower 502 draws indoor air or outdoor air into the duct 501 through an upstream end thereof and delivers the air toward the downstream end thereof.

The refrigerating cycle 509 is comprised of the evaporator 503, the compressor 505, a condenser 506, a receiver tank 507, and an expansion valve 508, which are connected to each other by piping. The compressor 505 is of a known variable capacity type. The compressor 505 may be a swash plate type in which the inclination of the swash plate is adjusted to vary the capacity, or may be of a vane type in which the effective number of vanes is adjusted to vary the capacity, or may be of a type in which an electromagnetic valve is provided in a return passageway, and the opening degree of the electromagnetic valve is controlled to adjust the amount of refrigerant returned to a suction side of the compressor, to thereby vary the capacity thereof. The compressor 505 includes an actuator 505a for adjusting the capacity, and an electromagnetic clutch 505b for bringing the compressor 505 into engagement with and disengagement from an engine, not shown, of the vehicle.

Cooling water of the engine is recirculated through the heater core 504 so that the air passing through the heater core 504 is heated by the cooling water. An air-mix damper 511 is located upstream of the heater core 504, and is angularly movable such that the proportion between an amount of air passing through the heater core 504 and an amount of air bypassing the heater core 504 is adjusted by the opening degree of the damper 511. The air passing through the heater core 504 and the air bypassing the same are mixed with each other On the side downstream of the heater core 504 to be adjusted in temperature. The mixed air is blown into the compartment 515 through a defrost blowoff outlet 512, a vent blowoff outlet 513, and a heat blowoff outlet 514. These outlets 512, 513 and 514 are selectively opened and closed by a mode selecting damper, not shown. The defrost blowoff outlet 512 opening along the windowpane 516 on the front side which defines the compartment 515, is normally opened manually or automatically when a mist occurs on the windowpane 516.

A microcomputer 517 is of a known type which includes a central processing unit (CPU), a read-only memory (ROM), a random access memory (RAM), etc.

An A/D converter 518 is connected to the microcomputer 517. A multiplexer 519 is connected to the A/D converter 518. Connected to the multiplexer 519 are a dew condensation sensor 520 provided at the windowpane 516 for detecting a mist thereon, an indoor-air temperature sensor 521 for detecting a temperature within the compartment 515, a temperature setter 522 for setting a temperature within the compartment 515, and an outdoor-air temperature sensor 523 for detecting a temperature of an outdoor air. Analog signals from the respective sensors and setter 520 to 523 are selected by the multiplexer 519, are converted into digital signals by the A/D converter 518, and are inputted into the microcomputer 517. An A/C switch 524 for instructing on- and off- modes of the compressor 505 is also connected to the microcomputer 517.

The microcomputer 517 has its output side connected to a motor for the blower 502, the actuator 505a and an electromagnetic clutch 505b of the compressor 505, and an actuator 510 for the air-mix damper 511 through respective drive circuits 525a to 525d. The microcomputer 517 controls the blower 502, the compressor 505 and the air-mix damper 511, based on the above-described signals inputted.

Figure 11:
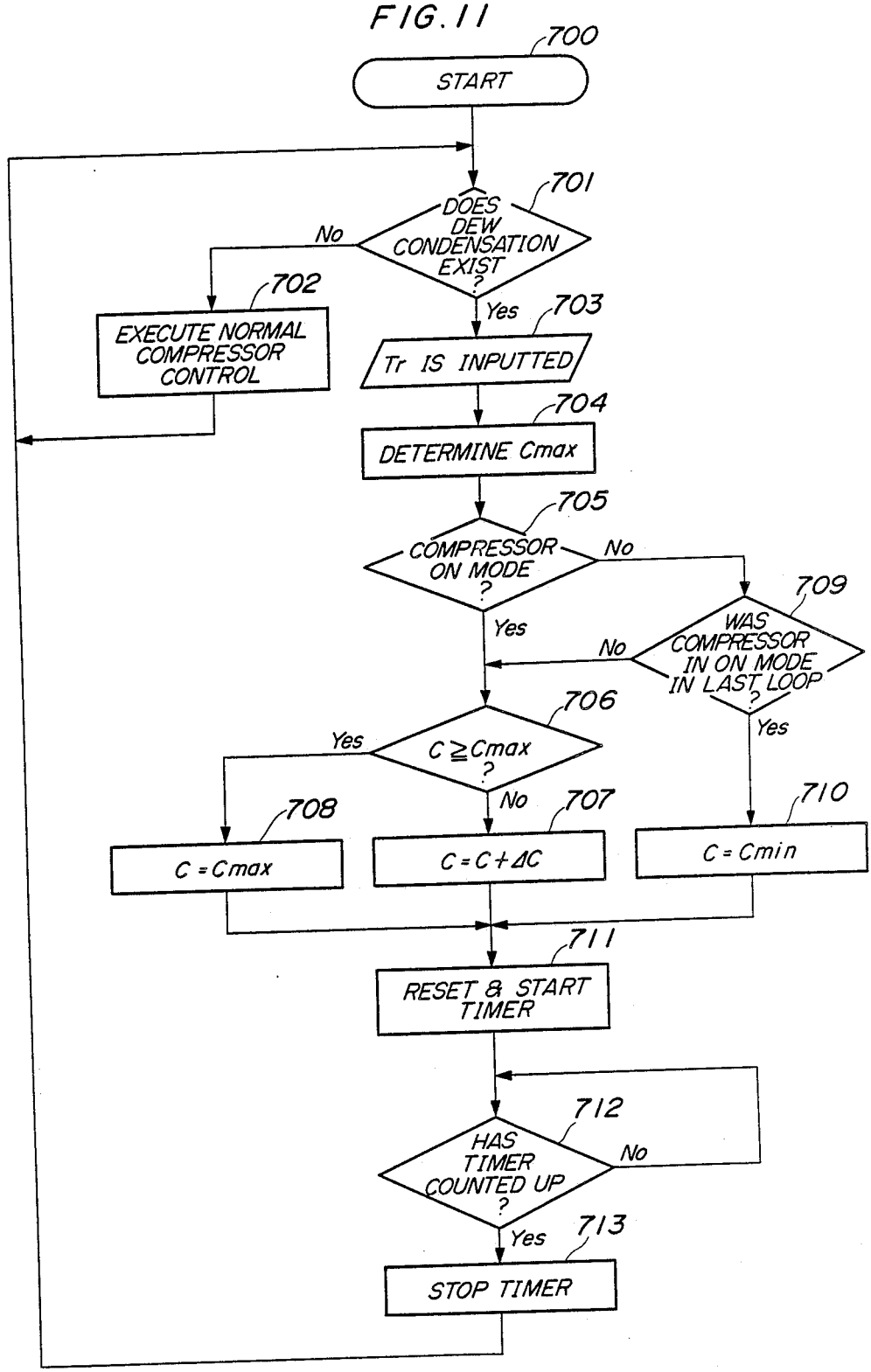
FIG. 11 is a flow chart showing the operation of the arrangement illustrated in FIG. 10.

FIG. 11 shows a compressor control routine of the microcomputer 517. The microcomputer starts its computation from a step 700, and judges in a step 701 whether or not the windowpane 516 is misted, based on the output from the dew condensation sensor 520. The processing at the step 701 and the dew condensation sensor 520 form the mist judging means 601 shown in FIG. 9.

When it is judged in the step 701 that no mist occurs, the program proceeds to a step 702 at which the compressor 505 is controlled in a normal manner. That is, the capacity of the compresser 505 is controlled so as to correspond to the requested temperature of air blown into the compartment 515. On the other hand, when it is judged in the step 701 that the mist occurs, the program proceeds to a subsequent step 703.

In the step 703, the output from the above-described indoor-air temperature sensor 521 is inputted and is stored as Tr. The step 703 and the indoor-air temperature sensor 521 form the temperature data generating means 602 shown in FIG. 9.

In a subsequent step 704, the maximum allowable capacity Cmax of the compressor 505 is determined on the basis of the indoor-air temperature Tr. Specifically, as shown in FIG. 12, when the indoor-air temperature is low, the maximum allowable capacity Cmax is minimum. However, the maximum allowable capacity Cmax increases as the indoor-air temperature Tr rises, and the capacity Cmax is brought to full capacity when the indoor-air temperature Tr is equal to or higher than a predetermined value. This step 704 constitutes the maximum capacity setting means 603 shown in FIG. 9.

The program then proceeds to a subsequent step 705 wherein it is judged whether or not the compressor is operating ("ON" mode), based on the output from the A/C switch 524. If the compressor is operating, the program proceeds to a step 706. In this step 706, it is judged whether the capacity C of the compressor is equal to or greater than the set maximum allowable capacity Cmax. If the compressor capacity C is smaller than the value Cmax, the program proceeds to a step 707 wherein the compressor capacity C is increased by a predetermined increment C, while if the capacity C is equal to or greater than Cmax, the compressor capacity C is set to and held at Cmax at a step 708.

If it is judged at the step 705 that the compressor is not operating or in "OFF" mode, it is judged at a step 709 whether the compressor was operating or in "ON" mode in the last loop. If the compressor was operating in the last loop, that is, if the present loop is the first loop in which the compressor has entered "OFF" mode, a step 710 is executed wherein the compressor capacity is set to a minimum value. If the compressor was also inoperative in the last loop, the above-mentioned step 706, and step 707 or 708 are executed to add the predetermined increment ΔC to the compressor capacity C.

By the processings of the steps 705 to 710, the compressor control means 604 shown in FIG. 9 is formed.

After the processing of the step 707, 708, or 710, has been completed, the program proceeds to a step 711. In the step 711, a timer incorporated in the microcomputer is started to count a predetermined time period. In a subsequent step 712, standby is effected until the timer counts up the predetermined time period. The timer is stopped at a subsequent step 713, and the program is returned to the step 701.

In the above described manner, so long as the windowpane 516 is misted, the above described processing except the step 702 is repeated so that the capacity of the compressor 505 is increased to the maximum allowable capacity. However, if the mist on the windowpane 516 has been cleared off during the increase in the capacity of the compressor 505, the judgment of the step 701 is turned to "NO" and, thereafter, the normal control takes place at the step 702.

Figure 12:
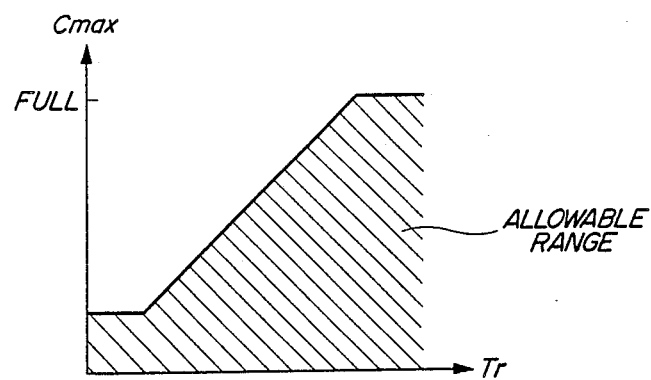
FIG. 12 is a graphical representation of the relationship between temperature within a compartment and the allowable maximum capacity, determination of the allowable maximum capacity shown in FIG. 11 being based on the characteristic of FIG. 12.
Figure 13:
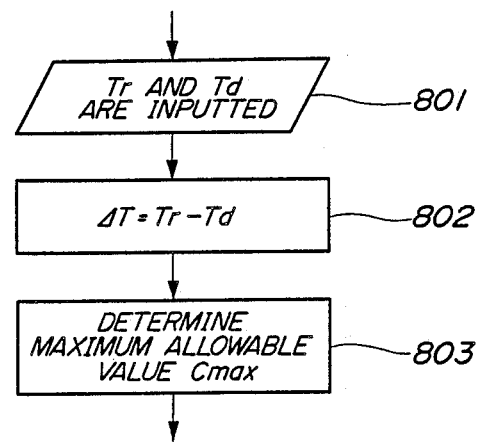
FIG. 13 is a part of a flow chart showing the operation of a modification of the third emobodiment illustrated in FIGS. 10 and 11.

FIG. 13 shows a modification of the third embodiment shown in FIGS. 10 through 12. In the modification, steps 801 to 803 are substituted for the steps 703 and 704 shown in FIG. 11. Specifically, in the step 801, the signal Tr from the indoor-air temperature sensor 521 and a signal Td indicative of a desired compartment temperature from the temperature setter 522 are inputted. In the step 802, a deviation T between the signals Tr and Td is computed. In the step 803, as a function of the deviation T, the maximum allowable capacity is determined. Thereafter, the compressor capacity is controlled within the range of the maximum allowable capacity, similarly to the third embodiment described previously with reference to FIGS. 10 through 12.

As described above, according to the third embodiment and the modification thereof shown in FIGS. 10 through 13, even if the mist occurs on the windowpane of the vehicle, the compressor capacity is raised within the maximum allowable capacity corresponding to the temperature within the compartment. Thus, the increase in the compressor capacity can be restricted when the temperature within the compartment is low. Consequently, it is possible to prevent the temperature within the compartment from being excessively lowered, and it is also possible to make the feeling good while efficiently preventing the mist on the windowpane.

What is claimed is:

1. An air conditioning system for a vehicle, said vehicle having a compartment and a windowpane, comprising:
cooling means for cooling air, said cooling means including a compressor of a variable capacity type;
heating means for heating air having passed through said cooling means;

damper means for controlling an amount of air flowing from said cooling means toward said heating means and an amount of air flowing from said cooling means and bypassing said heating means;

temperature detecting means for detecting a temperature of air within the compartment of the vehicle;

means for setting a desired temperature within the compartment of the vehicle;

first control means for controlling the capacity of said compressor in relation to a deviation between said detected temperature and said set temperature;

second control means for controlling an opening degree of said damper means in relation to said deviation;

mist detecting means for detecting a mist on the windowpane of the vehicle;

judging means, receiving an output from said mist detecting means, for judging whether or not the windowpane is misted; and first correction means, responsive to an output from said judging means, for increasing the capacity of said compressor by a predetermined amount when it is judged by said judging means that the windowpane is misted;

the improvement comprising:

second correction means, responsive to an output from said judging means, for correcting the opening degree of said damper means to a position where the amount of air flowing toward said heating means is increased by a predetermined amount when it is judged by said judging means that the windowpane is misted; said predetermined amount by which the opening degree of said damper means is increased by the second correction means being set to such a value as to compensate for an increase in cooling degree due to the increase in the capacity of said compressor, to thereby avoid a sudden change in temperature within the compartment.

2. An air conditioning system as defined in claim 1, further comprising:

valve means associated with said compressor and movable, in response to an output from said first control means, between a first position where the capacity of said compressor is greater and a second position where the capacity of said compressor is smaller.

3. An air conditioning system as defined in claim 2, wherein when said valve means is moved into said second position, said valve means allows a portion of a refrigerant discharged from said compressor to be returned to a suction side of said compressor.

4. An air conditioning system as defined in claim 1, wherein said mist detecting means includes means for detecting humidity in the vicinity of the windowpane, and said judging means includes means for judging that the windowpane is misted when the humidity detected by said mist detecting means is equal to or higher than a predetermined value.

5. An air conditioning system as defined in claim 1, wherein when said damper means assumes a position where all the air is allowed to flow to said heating means, said second correcting means does not correct the opening degree of said damper means.

* * * * *